United States Patent [19]

Keyes

[11] 4,131,171

[45] Dec. 26, 1978

[54] LOW ENERGY CONSUMPTION VEHICLE PROPELLED BY THERMAL ENGINE

[76] Inventor: John H. Keyes, P.O. Box 474, Nederland, Colo. 80466

[21] Appl. No.: 786,547

[22] Filed: Apr. 11, 1977

[51] Int. Cl.$^2$ ............................................. B60K 9/00
[52] U.S. Cl. .................................. 180/54 R; 60/709; 60/706; 74/572; 192/0.033
[58] Field of Search .................. 180/54 R, 65 A, 1 R; 60/6; 74/751, 843, 856, 859, DIG. 11, 572; 192/0.033, 0.077; 123/179 J

[56] References Cited

U.S. PATENT DOCUMENTS

| 3,734,222 | 5/1973 | Bardwick | 180/54 R |
| 3,870,116 | 3/1975 | Seliber | 180/54 R |
| 3,882,950 | 5/1975 | Strohlein | 180/54 R |

Primary Examiner—Joseph F. Peters, Jr.
Assistant Examiner—Gene A. Church
Attorney, Agent, or Firm—Gary M. Polumbus

[57] ABSTRACT

A thermal engine and energy accumulating flywheel are operatively connected to propel a vehicle, and a regulating means regulates the thermal engine to generally produce a limited constant maximum quantity of energy marginally in excess of that energy necessary to propel the vehicle under a constant desired operating condition. Sufficient energy accumulates in the energy storage flywheel to provide intermittent quantities of energy in a excess of that available from the thermal engine for propelling the vehicle. In this manner, fuel consumption by the thermal engine is significantly reduced and the amount of pollutants emitted is reduced, since the thermal engine is operated in a relatively constant condition to supply energy slightly in excess of that necessary for propelling that vehicle at a constant desired operating condition. Regulating the production of energy by the thermal engine allows a variety of different energy production levels which may be selectively utilized according to the contemplated mode of operation of the vehicle.

22 Claims, 5 Drawing Figures

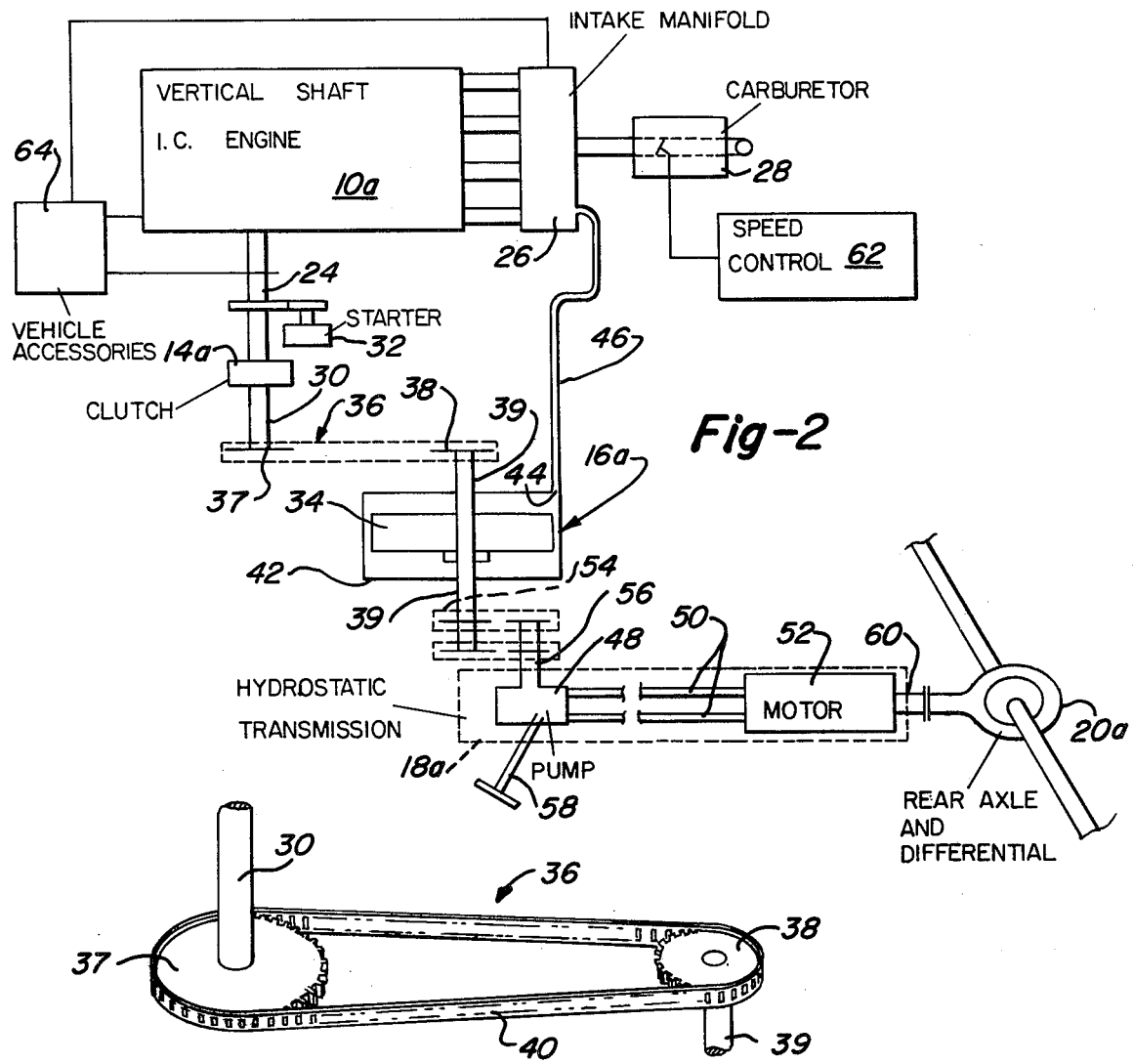
Fig-2
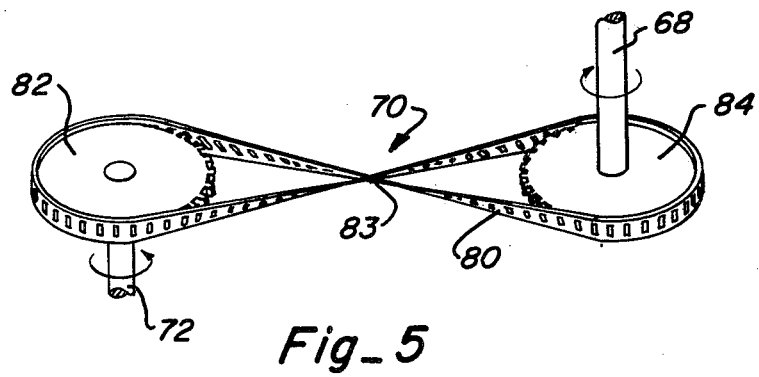
Fig-3
Fig-5

LOW ENERGY CONSUMPTION VEHICLE PROPELLED BY THERMAL ENGINE

BACKGROUND OF THE INVENTION

1. Field of the Invention

This invention relates to an improved apparatus and method for powering a vehicle by an internal combustion or thermal engine.

2. Brief Description of the Prior Art

The historical premise underlying the development of personal passenger transportation vehicles powered by internal combustion engines has been that, with increases in the weight of the vehicle and the demand for performance, the size of the internal combustion engine has been increased. Development of vehicles powered by internal combustion engines according to this premise has caused significant social problems in modern society. One such problem is that the large engines in these vehicles have consumed relatively large amounts of energy in the form of petrochemical fuel. Another problem is that the internal combustion engines emit significant amounts of pollutants into the air, particularly in urban areas. Under contemporary standards, the problems of excessive fuel consumption and air pollution have become of such importance that laws are in effect or will shortly come into effect to regulate and control the sales, use and character of vehicles powered by internal combustion engines. In addition, indirect restrictions on the use of such vehicles have resulted from the relatively high cost of fuel for propelling these vehicles.

In an effort to solve these and other problems associated with vehicles powered by internal combustion engines, technology has developed in two basic technological areas. The first developmental are has been an attempt to modify or improve contemporary internal combustion engines to improve fuel economy and decrease pollutant emissions. The second developmental area has concentrated on the development of alternative power sources for vehicles, other than internal combustion or thermal engines. Developments in the second area have proceeded on the assumption that the internal combustion engine can never be made to avoid the problems it has created and still meet society's contemporary needs for transportation. Developments in the first area have proceeded on the theory that the internal combustion engine can continue to be utilized if a great deal of research, development and resources are committed to improving the operation of the engine, and that society must pay the costs of such research and development as a price for maintaining its current standards of transportation.

The technical developments of improving fuel economy and decreasing emissions has involved a number of different approaches. One approach has been to add pollution control equipment to the standard vehicle engine. Generally the pollution control equipment has decreased fuel economy and engine performance and thus, while limiting emissions, has increased fuel consumption. Another approach has been to design different types of thermal engines, such as rotary engines, variable stroke engines, Stirling cycle engines, etc. In each case, the new engines have generally tended to be of increased cost and have not achieved significantly better performance regarding fuel economy or emissions. A further approach has been a slight reduction in engine size. At this time, reduction in engine size has been met with some significant consumer resistance, apparently because of certain unstated vehicle performance standards for acceleration, hill climbing capability, passing power, etc. One last approach has been to reduce the size and weight of the vehicle. Again at the present time, some consumers appear to demand certain unstated standards in the size and weight of their vehicles. These aspects must be viewed with the recognition that limitations of thermodynamic efficiency presently available from relatively large internal combustion engines will apparently restrict the success in modifying present internal combustion engines to significantly improve fuel economy and decrease emissions. In fact, major vehicle manufacturers have strongly argued that future vehicles powered by internal combustion engines will not be capable of meeting fuel mileage and emission standards required by law.

The technological developments of utilizing alternative sources of power for vehicles has basically centered around use of electric motors, primarily because electric motors do not emit pollutants and the generation of electrical power is thought to be within the resource capability of most countries without significant reliance on foreign sources of energy. However, an electrically powered vehicle under contemporary standards is a significantly different type of vehicle than can realistically be enjoyed and utilized by society. First of all, an electrical vehicle is limited in its long distance operating range. It is incapable of storing sufficient energy in its batteries to propel the vehicle over relatively long distances, and facilities for recharging batteries at predetermined intervals do not exist, which create significant limitations in mobility. In addition, present electric vehicles are of considerable weight since the electric motors, motive drive means and the batteries are generally large and relatively heavy. When employed in a vehicle, a high percentage of the energy stored is utilized merely in propelling the electric motors, batteries, etc. This, of course, reduces the effective range of the electric vehicle and decreases energy utilization efficiency for passenger transportation. Furthermore, if electric vehicles are to attain the current performance standards apparently demanded by the majority of consumers, for whatever reasons, the power capacity of the electric motors, the motive drive means and the batteries must be further increased. Motors of the capacity required are expensive and of large size and weight, which further complicates the present weight and efficiency problems. Lastly, to regenerate energy during times when the electric vehicle is stopped or slowed is relatively ineffective in increasing the range of the vehicle. Regeneration of energy in this manner will not supply any significantly increased portion of the vehicle's total energy requirements. The regeneration apparatus is generally relatively complicated and expensive and further adds to the weight of the vehicle.

In some electric vehicles, energy storage flywheels have been used to provide intermittent power capabilities exceeding the capacity of the electric motor. However, utilization of flywheels in combination with electric motors has not solved any of the foregoing problems regarding the weight of the vehicle and the availability of electrical sources for replenishing the batteries. Another problem in utilizing a flywheel with an electric motor is that the additional weight of the flywheel aggravates the already serious weight problem of the electric vehicle. A significant problem is that the electric motor is generally incapable of controlling an overspeed condition of the flywheel, thereby requiring use of auxilary braking and control devices to achieve such control. Another problem with vehicles powered by electric motors and flywheels is that the electric motor is incapable of supplying additional power for operating the accessories of typical vehicles, such as a heater, air conditioner, power steering and power brake units. These accessories themselves will generally consume more power than is available from a reasonably sized electric motor typically used for propelling conventional electric vehicles.

SUMMARY OF THE INVENTION

It is the general objective of the present invention to achieve a balanced and a controlled relationship between the energy production of a thermal or internal combustion engine and the average energy requirements for operating a vehicle. By this concept, the size of the engine can be substantially reduced with an accompanying reduction in fuel consumption and the amount of emissions. Furthermore, the contemporary standards of vehicle performance, size, weight and comfort are not sacrificed or eliminated to obtain the desired decreased fuel consumption and emission of air pollutants.

Other objects of the invention are to provide an improved apparatus and method for powering a vehicle with an internal combustion or thermal engine which supplies better fuel economy during stop and go commuter operation than during relatively high speed turnpike operation, and which supplies increased fuel economy at relatively high turnpike speeds over that which is typically supplied with present vehicles.

Further objectives of the invention are to utilize relatively low cost and readily available technology to reduce the cost of new vehicles and to encourage the replacement of existing conventional engines and propelling apparatus in present and pre-existing vehicles.

Generally summarized, the improved apparatus of the present invention includes a relatively small internal combustion or thermal engine in a vehicle for supplying energy to an energy accumulating flywheel. An infinitely variable ratio transmission means is operatively connected with the flywheel for transmitting power for propelling the vehicle. The internal combustion engine is regulated and operated as a stationary engine, i.e. at a generally constant speed and operating characteristics, while energy is stored over a time period by the flywheel. Peak power demands for the vehicle, for example during hill climbing, acceleration and passing, are obtained from the energy stored in the flywheel.

Since the stored flywheel energy supplies intermittent peak power demands, the capacity of the engine may be considerably reduced and, consequently, balanced to provide limited constant power slightly in excess of that power required for operating the vehicle at its maximum constant speed in desired situations. The engine becomes more efficient since it operates at or near its maximum capacity during a high proportion of time, in distinction to conventional large engines which are operated infrequently at maximum capacity and efficiently. In addition, the engine can be controlled to supply a reduced level of power in slow speed operation, such as local commuting situations, where the maximum vehicle speed is limited by traffic. This control and regulation achieves even greater fuel consumption economy at variable low speeds than the fuel consumption economy achieved at relatively high constant speeds. The infinitely variable ratio transmission assures that the vehicle's speed will be widely variable with relation to the speeds of the flywheel and the engine, which is necessary since the flywheel and engine may decrease in rotational speed as the speed of the automobile increases, in distinction to conventional vehicles where the speed of the engine increases as the speed of the vehicle increases.

In summary, utilization of the present invention, will result the following major benefits which have heretofore eluded a reasonably effective solution:

The total amount of air pollutants from vehicles will be reduced due to the substantially reduced size and regulated operating conditions of the internal combustion engine, the reduction being in the order of 60%; and The fuel consumption by vehicles will be substantially reduced since the internal combustion engine is much smaller, and can be controlled and regulated at conditions which supply only a slightly increased amount of power over that required to propel the vehicle at desired constant speeds, the mileage increase being in the order of 300%.

With these objectives, and benefits in mind, a fuller appreciation of the invention and its advantages may be obtained from the following brief description of the drawings, description of the preferred embodiments and the appended claims.

BRIEF DESCRIPTION OF THE DRAWINGS

FIG. 2 is a schematic illustration of one embodiment of the present invention illustrating many of the aspects of FIG. 1 in greater detail.

FIG. 3 is a perspective view of a cable chain and sprocket drive arrangement illustrating a portion of FIG. 2 in greater detail.

FIG. 4 is a schematic illustration of another embodiment of the present invention illustrating many of the aspects of FIG. 1 in greater detail.

FIG. 5 is a perspective view of a cable chain and sprocket arrangement illustrating a portion of FIG. 4 in greater detail.

DESCRIPTION OF PREFERRED EMBODIMENTS

Figure 1:
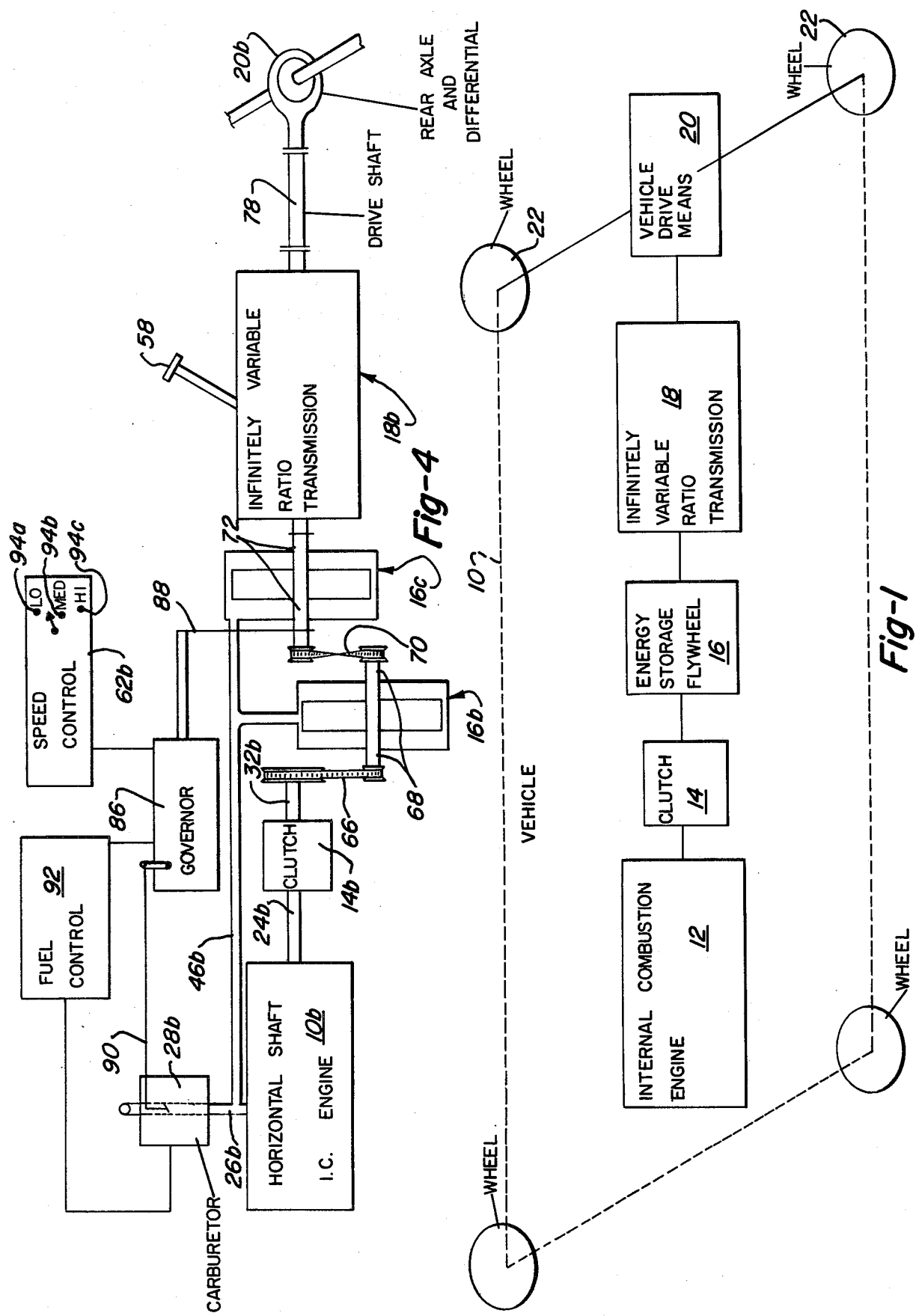
FIG. 1 is a schematic illustration of the general concepts of the present invention.

The present invention may generally be understood from FIG. 1 as comprising a vehicle 10 powered by a relatively low power internal combustion engine 12 or other thermal engine. Rotational output power from the internal combustion engine 12 is supplied through a clutch 14 for rotating an energy storage flywheel 16. The energy storage capability of the flywheel 16 is determined by the weight, configuration and rotational speed of the energy storage flywheel 16, which are determined in accordance with the output power from the internal combustion engine 12 and the power requirements for operating the vehicle 10. The rotation energy available from the energy storage flywheel 16 is coupled through an infinitely variable ratio transmission 18 to conventional vehicle drive means 20 connected for propelling the vehicle 10 by drive wheels 22 or the like. The infinitely variable ratio transmission 18 is required for operating the vehicle drive means 20 since it is contemplated that at certain times the energy storage flywheel 16 will be decreasing in rotational speed as the drive wheels 22 are increasing in rotational speed, in distinction to conventional propulsion systems where the engine speed increases as the speed of the drive means increases.

The power output of the internal combustion engine 12 under its operating conditions and the energy storage capability of the flywheel 16 under its operating conditions are predetermined to achieve a more realistic balance between energy production and energy utilization under desired operating conditions of the vehicle 10. Balancing energy production to energy utilization recognizes that, under normal operating conditions only intermittent periods of high energy output are required, while at other times, very low or no energy output is required. It is within this concept of energy balance that the internal combustion engine is chosen to operate at a power output and within limits of generally constant speed to supply energy production over time which is integrated by the flywheel for use in propelling the vehicle during intermittent high energy requirement situations, such as acceleration, passing and hill climbing, as well as for use in constant energy use situations such as steady turnpike driving.

The size of the internal combustion engine 12 is selected to supply at least the usual sustained and constant energy requirements of the vehicle. Those sustained energy requirements are usually the power required to propel the vehicle at a constant, maximum speed and the power required for operating the vehicle accessories such as air conditioning, power steering and the electrical alternator or generator, for example. Power required to propel the vehicle at its top desired, constant highway speed is basically dependent upon the air resistance of the vehicle at that speed and the rolling friction of the vehicle. Other factors such as grades encountered in an intended area of operation may be considered. Typically, for an average American compact automobile, about fifteen horsepower is required for propulsion fifty-five miles per hour and about twenty-five horsepower is required for propulsion at seventy miles per hour. In a relatively large American luxury car, approximately twenty-five horsepower is required for propulsion at fifty-five miles an hour and forty-five horsepower is required for propulsion at seventy miles an hour. Generally speaking, the size of the internal combustion engine according to the invention can be reduced from 2 to 17 times over the size of conventional engines in present vehicles.

With the capacity of the internal combustion engine determined, peak energy demands for propelling the vehicle under conditions such as acceleration, passing and hill climbing are determined for the purpose of selecting the characteristics of the energy storage flywheel 16 for the vehicle. The amount of energy stored in the energy storage flywheel is dependent upon its mass or weight and its configuration and is directly related to the square of its rotational speed. Typically, a flywheel having a diameter of approximately 15 to 18 inches and a weight of 200 to 400 pounds and rotated at a top rotational speed of approximately 9,000 RPM will deliver sufficient intermittent peak power requirements equal to or exceeding those of a conventional vehicle powered only by a conventional internal combustion engine. A flywheel of this size will also fit conveniently within an engine compartment of a conventional vehicle. Furthermore, the energy storage flywheel 16 will usually provide sufficient energy for climbing typically encountered road grades over periods of time under relatively good and sustained vehicle speeds. One exemplary flywheel assembly is more fully disclosed in Flywheel Energy Accumulator, Ser. No. 786,544, filed on the filing date herein by the same inventor.

The clutch 14 is used to disconnect the engine 12 from the energy storage flywheel 16 when starting the engine 12, since a typical small engine starter is incapable of rotating the flywheel while starting the engine.

The infinitely variable ratio transmission 18 is coupled to the energy storage flywheel 16 for quickly removing stored energy from the flywheel under peak power requirements. An infinitely variable ratio transmission is required, since the energy storage flywheel will typically be decreasing in rotational speed while supplying energy for increasing the rotational speed of the drive wheels 22 of the vehicle 10. Therefore, conventional transmissions of relatively few fixed ratios or steps are inappropriate for use in conjunction with the present invention.

The vehicle drive means 20 is of conventional design and may comprise, for example, a conventional differential and rear axle assembly utilized in the majority of present day internal combustion engine powered vehicles.

A more specific appreciation of one embodiment of the invention may be obtained to reference to FIG. 2. In this embodiment, the internal combustion engine 10a is of the type having a vertical power output shaft 24. The engine 10a also includes a typical intake manifold 26 to which a conventional carburetor 28 is connected to deliver fuel to the engine 10a. In the well known manner, variable levels of vacuum are created within the intake manifold 26 depending upon the opening of the throttle valve in the carburetor 28 and the engine operating conditions. Fuel and air are mixed in the carburetor 28 and delivered to the intake manifold 26 where the fuel and air mixture is distributed to the combustion chambers or other power conversion apparatus within the engine 10a.

Rotational power from the vertical output shaft 24 from the engine 10a is coupled through the clutch 14a to a shaft 30. The clutch 14a may be of the conventional automatic centrifical type, the hydrodynamic coupling type or other type allows shafts 24 and 30 to remain uncoupled at low rotational speeds of the shaft 24 but couples shafts 24 and 30 together at high speeds.

Rotational energy from the engine 10a at shaft 30 is supplied to a flywheel 34 of the flywheel assembly 16a by means of a nylon and urethane cable chain and sprocket arrangement 36 shown in greater detail in FIG. 3. A relatively large sprocket 37 is attached to shaft 30 and a relatively small sprocket 38 is attached to an axle shaft 39 attached to the flywheel 34 of the flywheel assembly 16a. A nylon and urethane cable chain 40 mechanically connects sprockets 37 and 39 to rotate these sprockets and supply power from shaft 30 to the shaft 39.

Sprocket 37 is typically at least twice the diameter of sprocket 39, to increase the rotational of shaft 39 with respect to shaft 30 by at least two times. This speed increase is for the purpose of causing the flywheel 34 to rotate at a relatively high speed, allowing a considerable amount of energy may be stored. For a conveniently sized flywheel 34 to fit within the conventional automobile and to store sufficient energy for suppling peak power requirements for a conventional automobile, it must generally be rotated at approximately 9,000 RPM. It is typical that most internal combustion engines are limited to a maximum rotational speed of less than 5,000 RPM, thus allowing the two to one ratio of upgearing to be advantageously used.

The nylon and urethane cable chain and sprocket arrangement 36 avoids excessive noise of conventional beveled, spur or helical gears at the high rotational speeds contemplated. To avoid excessive noise with direct coupled conventional gear drives requires the utilization of precision ground and lapped gears, which are very expensive. The present nylon and urethane cable chain and sprocket arrangement 36 requires no lubrication and runs relatively noiselessly. If the power requirement of a single cable chain 40 is exceeded, a plurality of such cable chains can be connected in parallel with each cable chain being carried by its own set of sprockets.

Benefits of operating the internal combustion engine in the upper range of its rotational speed are that, at higher speeds the engine generally tends to produce more torque and horsepower output and operates at its maximum thermodynamic efficiency. Since the energy stored by a rotating flywheel is proportional to the square of its rotational speed, utilization of the internal combustion engine allows energy to be supplied to the flywheel more rapidly at the higher rotational speeds than with other energy supply means such as conventional electrical motors where the torque output generally decreases with increasing speed. This is important because the flywheel accumulates 75% of its stored energy in the upper half of its safe rotational speed range.

One flywheel assembly which may be suitable and conveniently used in a conventional personal transportation vehicle is disclosed in the aforementioned Flywheel Energy Accumulator filed by the inventor herein. The flywheel assembly 16a is generally comprised of the single axle shaft 39 having the relatively heavy disc-like flywheel 34 connected thereto for rotation. A cage 42 is provided for supporting the shaft 39 housing the rotating flywheel and for positioning the flywheel 34 in a desired orientation. The energy storage efficiency of the flywheel 34 can be increased by evacuating the volume in which it rotates, and to this end, cage 42 is of relatively air tight construction and is provided with an opening 44 for evacuating the interior of cage 42. The opening 44 is connected to the intake manifold 26 of the internal combustion engine 10a by a conduit 46 to allow the vacuum created in the intake manifold 26 to evacuate the flywheel cage 42. As a result, the efficiency in maintaining and storing energy by the rotating flywheel 40 is increased.

The flywheel 34 of the flywheel assembly 16a is positioned with its axis of rotation along shaft 39 vertical in the vehicle in FIG. 2. Positioned in this manner, the gyroscopic effects of the flywheel do not adversely affect the maneuverability of the vehicle.

One form of the infinitely variable ratio transmission is a conventional hydrostatic transmission 18a. Hydrostatic transmissions are well-known in the art and are commercially available. In general the hydrostatic transmission 18a comprises a conventional hydraulic pump 48 coupled through hydraulic hoses or conduits 50 to a hydraulic motor 52. The pump 48 is operatively connected to utilize rotational energy from the flywheel 34 by means of another nylon and urethane cable chain and sprocket arrangement 54. Since relatively large amounts of energy can be transferred from the rotating shaft 39 of the flywheel assembly 16a, a plurality of nylon and urethane cable chains and sprockets are connected in parallel between the input shaft 56 of the pump 48 and the rotating shaft 39. A control 58, which serves as the accelerator pedal in the vehicle, controls the amount of hydraulic fluid conducted from the pump 48 to the hydraulic motor 52. The pump 48 functions as a variable capacity hydraulic pump for supplying variable energy to the motor 52. A power output shaft 60 of the hydraulic motor 52 is connected to a conventional rear axle and differential 20a in the vehicle.

The engine 10a, the flywheel assembly 16a and the hydraulic pump 48 will be typically located in the conventional engine compartment of the vehicle. The control 58 is operatively connected into the passenger compartment for access by the operator of the vehicle. The conduits 50 conduct energy in the form of pressurized hydraulic fluid from the pump 48 in the engine compartment to the motor 52 connected to the rear axle and differential 20a, thereby eliminating the conventional drive shaft in the vehicle.

For the purpose of controlling the speed of the engine 10a, a speed control 62 is located for access by the operator of the vehicle. The speed control 62 may take one form of a simple mechanical throttle connected to the carburetor 28. In this manner, an extremely simple form of a constant speed control for the engine 10a is provided.

By utilizing an internal combustion engine, the typical vehicle accessories 64 of most conventional vehicles can be easily operated and maintained. The output shaft 24 of the engine 10a will supply rotational force for operating a conventional alternator or generator, a conventional power steering pump, and a conventional air conditioning compressor. The intake manifold 26 will supply energy for operating conventional power brakes. Furthermore, if the internal combustion engine 10a is of the water cooled variety, which is typical, the conventional heater in the automobile may be easily operated. For these reasons and others, substitution of the present invention in a present or preexisting automobile can be conveniently accomplished.

An alternative embodiment of the present invention may be understood by reference of FIG. 4. In this embodiment a horizontal shaft internal combustion engine 10b is utilized. The horizontal output shaft 24b from the engine 10b is coupled through the clutch 14b to a horizontal shaft 32b. A nylon and urethane cable chain and sprocket arrangement 66, similar to that shown in FIG. 3, couples rotational energy from the shaft 32b to the axle shaft 68 of a first flywheel assembly 16b. Energy from the first flywheel assembly 16b is coupled by a second cable chain and sprocket arrangement 70 to the axle shaft 72 of a second flywheel assembly 16c. The output from axle shaft 72 to the second flywheel assembly 16c is operatively connected to the infinitely variable ratio transmission 18b.

Another form of an infinitely variable ratio transmission, is disclosed in Infinitely Variable Ratio Permanent Magnet Transmission, Ser. No. 786,545, filed on the filing date herein by the inventor herein. Output from the transmission 18b is connected to a conventional drive shaft 78 which in turn is connected in the usual manner to the conventional rear axle and differential assembly 20b. Operation of the transmission 18b is controlled by the control 58 located for access by the vehicle operator.

In the embodiment of the invention shown in FIG. 4, the internal combustion engine 10b and the two flywheel assemblies 16b and 16c are intended to be utilized in the conventional engine compartment in the vehicle. The shafts 24b, 32b, 68 and 72 are aligned generally horizontally with their axes parallel to the longitudinal axis of the vehicle.

The flywheels of the flywheel assemblies 16b and 16c are connected to rotate of the same speeds in opposite directions by the nylon and urethane cable chain and sprocket arrangement 70, better illustrated in FIG. 5. Connected in this manner, the flywheels counterrotate to cancel the gyroscopic effects created by each flywheel to avoid effects on vehicle maneuverability. In FIG. 5, the nylon and urethane cable chain 80 is placed in figure-eight shape around the equally sized sprockets 82 and 84. In this manner, shaft 68 rotates in one direction and shaft 72 rotates in the opposite direction at the same speed. Although not shown, means such as rubbing block may be employed at the position 83 where the cable chain 80 crosses itself to prevent undue wear on the cable chain.

Shown in FIG. 4, the air-tight cages of the flywheel assemblies 16b and 16c may be evacuated by vacuum from the intake manifold 26b from the engine 10b, in a manner similar to that previously described in conjunction with FIG. 2.

For the purpose of controlling the rotational speed and hence the energy accumulated by the flywheels of the flywheel assemblies 16b and 16c, there is provided a governor 86 connected by conventional means 88 to sense the rotational speed of the flywheels, shown in FIG. 4. The governor 86 is connected by linkage means 90 and by a fuel control 92 to control the carburetor 28b, and hence, operation of the internal combustion engine 10b. A speed control 62b is operatively connected to the governor 86 for limiting the speed and instantaneous power output of the engine 10b. The speed control 62b is located for access by the operator of the vehicle and may have a plurality of speed control settings 94a, 94b and 94c.

The plurality of speed control settings for the engine and flywheels allows the engine to supply only that limited maximum energy which will be utilized according to selected conditions of operation of the vehicle. For example in a relatively slow stop and go local traffic, a low speed setting at 94a will be utilized whereby only that energy necessary for moving the vehicle at a maximum of speed 40 miles an hour would be supplied by the engine while the flywheel assemblies accumulate an energy reserve for supplying intermittent larger requirements for repeated accelerations after recurring stops. In this manner, less fuel is consumed by the engine and operation of the vehicle becomes more economical than if the engine is supplying varying energy for repeated intermittent large requirements. A medium speed setting 94b is utilized for example, for town and country driving, limiting the upper speed to 50 miles per hour while allowing the flywheel assemblies to accumulate enough energy for supplying peak intermittent requirements. A high speed setting 94c is utilized when the vehicle is operated at relatively high turnpike and freeway speeds. In this manner, the engine 10b consumes only the fuel necessary in balancing its energy production to vehicle energy utilization during a number of different modes of operation. By this arrrangement, it is apparent that less energy is consumed and more fuel economy results from lower constant speed settings. This economy of operation, available with the present invention, will provide better fuel mileage in commuter operation then at constant turnpike operation because the engine is operating under constant conditions at preselected lower speeds.

The governor 86 serves a further purpose of limiting the rotational speed of the flywheels to a safe maximum speed. It is possible that the energy of the moving vehicle may increase the speed of the flywheels above a predetermined maximum safe limit. If such a situation should occur, there is a potential that the flywheels will shatter or disintegrate. This situation is avoided by the present arrangement, since the fuel to the carburetor may be limited or cut off by the fuel control 92 and the internal combustion engine operated as a brake to absorb energy from the flywheels. When operated as a brake, the engine 10b acts as an air pump by compressing the intake air and exhausting the air.

It is apparent that considerable energy can be accumulated by a rotating flywheel. This energy may be rapidly removed by the infinitely variable ratio transmission and supplied for propelling the vehicle when required for conditions such as acceleration, hill climbing, passing, etc.. Since peak power demands from a vehicle generally occur at infrequent and intermittent time periods, the relatively small capacity internal combustion engine can supply sufficient energy to the rotating flywheel to be accumulated over a period of time for supplying these peak demands while the engine also supplies the continual requirements for operating the vehicle under constant predetermined conditions.

The internal combustion engine may be relatively small in capacity, for example, for fifteen to fifty horsepower, to achieve such results. Consequently, the amount of fuel consumed and pollutants emitted by a relatively small engine is considerably less than with a relatively large engine. A general idea of the decrease in fuel consumption can be seen from the following table where horsepower reduction is compared to an increase in mileage obtainable.

| MILEAGE IMPROVEMENT ESTIMATOR | | | |
|---|---|---|---|
| Horespower Reduction | Mileage Increase | Horsepower Reduction | Mileage Improvement |
| 1.5 Times | 50% | 5.0 Times | 400% |
| 2.0 Times | 100% | 5.5 Times | 450% |
| 2.5 Times | 150% | 6.0 Times | 500% |
| 3.0 Times | 200% | 6.5 Times | 550% |
| 3.5 Times | 250% | 7.0 Times | 600% |
| 4.0 Times | 300% | 7.5 Times | 650% |
| 4.5 Times | 350% | 8.0 Times | 700% |

Furthermore, since the amount of fuel consumed is significantly reduced, the amount of pollutants emitted into the air is also substantially reduced.

The preferred embodiments of the present invention have been specifically described so as to enable a relatively full and complete understanding of the present invention. It should be understood, however, that the scope of the present invention is defined by the following claims, which are intended to encompass a scope of invention to the extent that the prior art allows.

I claim:

1. A method of simultaneously reducing fuel consumption in a vehicle propelled by a thermal engine and reducing the amount of pollutants emitted by the thermal engine, comprising the steps of:
   providing an energy storage flywheel having an operational capability of accumulating sufficient energy for generally supplying intermittent high energy requirements for propelling the vehicle, positioning the energy storage flywheel within the vehicle, continuously operatively connecting the energy storage flywheel to the thermal engine during vehicle operation, continuously operating the thermal engine to produce energy to be utilized in propelling the vehicle during operation, regulating the thermal engine to generally produce a maximum quantity of energy marginally larger than that predetermined quantity of energy necessary to propel the vehicle at a generally constant predetermined and maximum speed, directly delivering energy produced by the thermal engine to the energy storage flywheel, accumulating a quantity of energy by the energy storage flywheel over a predetermined period of time sufficient to supply intermittent quantities of energy significantly greater than the maximum regulated quantity of energy supplied from the thermal engine, selectively removing quantities of energy from the energy storage flywheel a predetermined time after the energy produced by the thermal engine has been delivered to the flywheel, and utilizing at least part of the energy selectively removed from the energy storage flywheel for propelling the vehicle.

2. A method as recited in claim 1, further comprising:
limiting the thermal engine as the only source of energy for the energy storage flywheel.

3. A method as recited in claim 1, further comprising:
limiting the maximum capacity of the thermal engine to an amount for producing an amount of energy which is marginally in excess of that energy required for propelling the vehicle at a constant predetermined maximum speed.

4. A method as recited in claim 3 further comprising:
determining the maximum sustained inclinations in a roadway to be encountered in operating said vehicle prior to accomplishing the aforesaid step of limiting the thermal engine to a maximum capacity.

5. A method as recited in claim 1 further comprising:
providing an infinitely variable ratio transmission,
positioning the infinitely variable ratio transmission within the vehicle, and
operatively connecting the infinitely variable ratio transmission to the energy storage flywheel for selective removal of accumulated energy.

6. A method as recited in claim 5 further comprising:
operatively connecting the infinitely variable ratio transmission to propel the vehicle.

7. A method as recited in claim 1 further comprising:
selectively further regulating the thermal engine to generally produce a second limited maximum quantity of energy less than the maximum quantity of energy first aforementioned, the second quantity of energy being marginally larger than that predetermined quantity of energy necessary to propel the vehicle in a generally constant second predetermined maximum speed less than the maximum speed first aforementioned.

8. A method as recited in claim 7 further comprising:
selectively regulating the thermal engine to generally produce a third limited maximum quantity of energy less than the second maximum quantity of energy, the third quantity of energy being marginally larger than that predetermined quantity of energy necessary to propel the vehicle in a generally constant third predetermined maximum speed less than the second maximum speed.

9. A method as recited in claim 1 further comprising:
limiting the maximum amount of energy accumulated by said energy storage flywheel by selectively terminating energy production of said thermal engine while said engine remains continuously connected to said flywheel, thereby to operate said engine as an energy absorbing reservoir upon the condition of energy accumulation by said flywheel exceeding a predetermined maximum quantity.

10. In a transportation vehicle, an invention comprising:

a thermal engine continuously operative to solely produce energy to be utilized in propelling said vehicle when said vehicle is in operation, an energy storage flywheel having an operational capability of accumulating sufficient energy for generally supplying intermittent high energy for use in propelling said vehicle, means operatively continuously connecting said thermal engine and said energy storage flywheel for directly conducting vehicle propulsion energy produced by said thermal engine to said energy storage flywheel for accumulation by said energy storage flywheel, a variable ratio transmission operatively connected to supply energy therethrough for propelling said vehicle, the energy connected through said variable ratio transmission being the only source of energy for propelling said vehicle, means operatively connecting said variable ratio transmission and said energy storage flywheel for conducting energy from said energy storage flywheel to said variable ratio transmission, control means associated with said variable ratio transmission for selectively controlling the amount of energy transmitted from said energy storage flywheel for propelling said vehicle, and means for regulating said thermal engine to generally produce a maximum instantaneous quantity of energy marginally in excess of that predetermined quantity of energy necessary to propel said vehicle at a generally constant predetermined maximum speed.

11. An invention as recited in claim 10 further comprising:

a cage for receiving said energy storage flywheel within the interior thereof, said cage being of relatively air tight construction; and means associated with said thermal engine for at least partially evacuating the interior of said cage.

12. An invention as recited in claim 11 wherein said means for at least partially evacuating the interior of said cage comprises:

an air intake manifold means associated with said thermal engine; and a conduit connecting said air intake means and the interior of said cage.

13. An invention as recited in claim 10 wherein at least one of said connecting means comprises:

at least one chain, and at least one sprocket for supporting said chain.

14. An invention as recited in claim 13 wherein at least one of said chains comprises a cable chain.

15. An invention as recited in claim 10 said regulating means further include:

additional means for regulating said thermal engine to generally produce a second maximum instantaneous quantity of energy less than the maximum instantaneous quantity of energy first aforesaid, the second maximum instantaneous quantity of energy being marginally in excess of that predetermined quantity of energy necessary to propel said vehicle at a generally constant predetermined second maximum speed less than the maximum speed first aforesaid.

16. An invention as recited in claim 15 wherein said regulating means comprise:
speed control means for operatively controlling the speed of said thermal engine.

17. An invention as recited in claim 10 wherein said regulating means comprise:
speed control means for operatively controlling the speed of said thermal engine.

18. An invention as recited in claim 17 further comprising:
means associated with said thermal engine for delivering fuel to said engine for use in producing energy, and
governor means operatively connected to sense the speed of rotation of said energy storage flywheel for controlling said fuel delivering means in response to the sensed speed of rotation of said energy storage flywheel.

19. An invention as recited in claim 18 further comprising:
fuel control means, associated with said governor means and said fuel delivery means, for selectively terminating a supply of fuel to said fuel delivery means.

20. An invention as recited in claim 10 wherein said thermal engine has a maximum capacity of producing energy which is marginally in excess of that required for propelling the vehicle at a constant maximum predetermined speed.

21. In a propulsion vehicle of the type including an energy storage flywheel, a thermal engine operatively connected to supply energy to said energy storage flywheel, said thermal engine including as an integral part thereof an intake means creating a partial vacuum pressure source during operation of said engine, vehicle propulsion means operatively connected to the energy storage flywheel for receiving energy therefrom to propel said vehicle, a substantially airtight enclosure defining an interior within which said flywheel is operatively positioned, and an improvement comprising:
means operatively connecting the flywheel enclosure with the intake means for communicating the partial vacuum pressure source to the interior of said enclosure, whereby to partially evacuate the interior of said enclosure during engine operation and thereby decreasing the energy loss of said flywheel.

22. An invention as recited in claim 21 wherein:
said intake means of said thermal engine comprises an intake manifold, and
said communicating means comprises a hollow conduit operatively extending to connect the interior of said flywheel enclosure with the intake manifold.

* * * * *